UNITED STATES PATENT OFFICE.

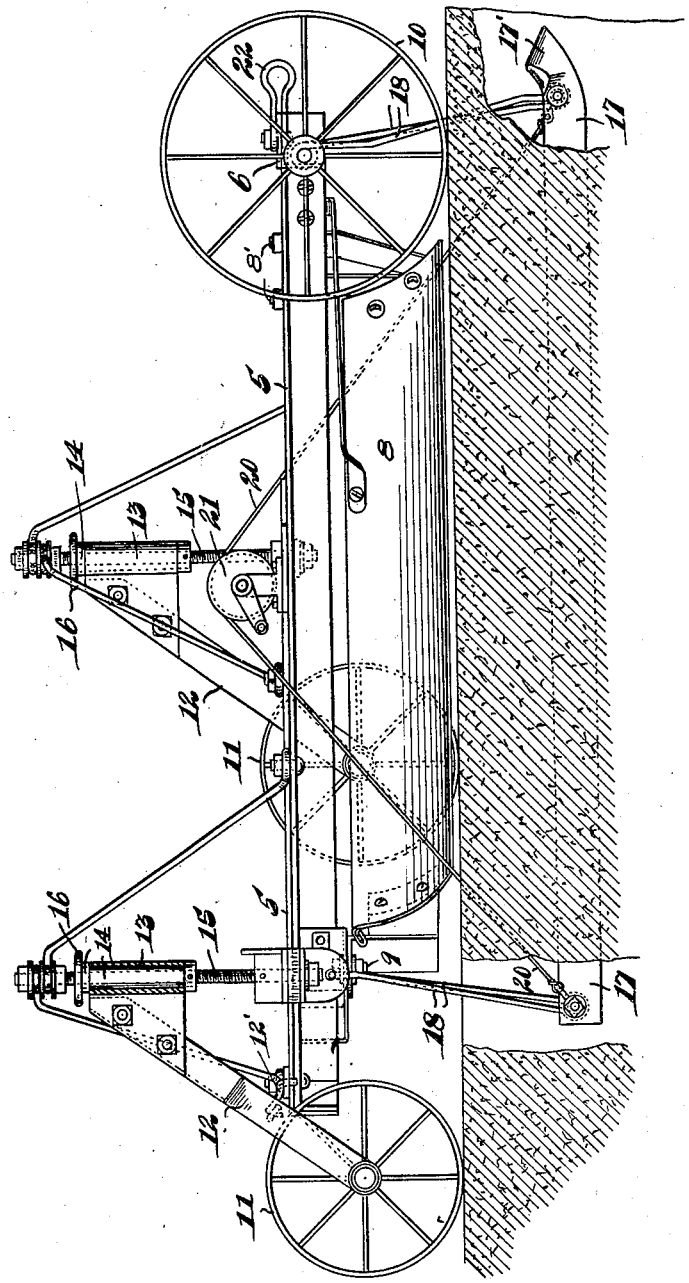

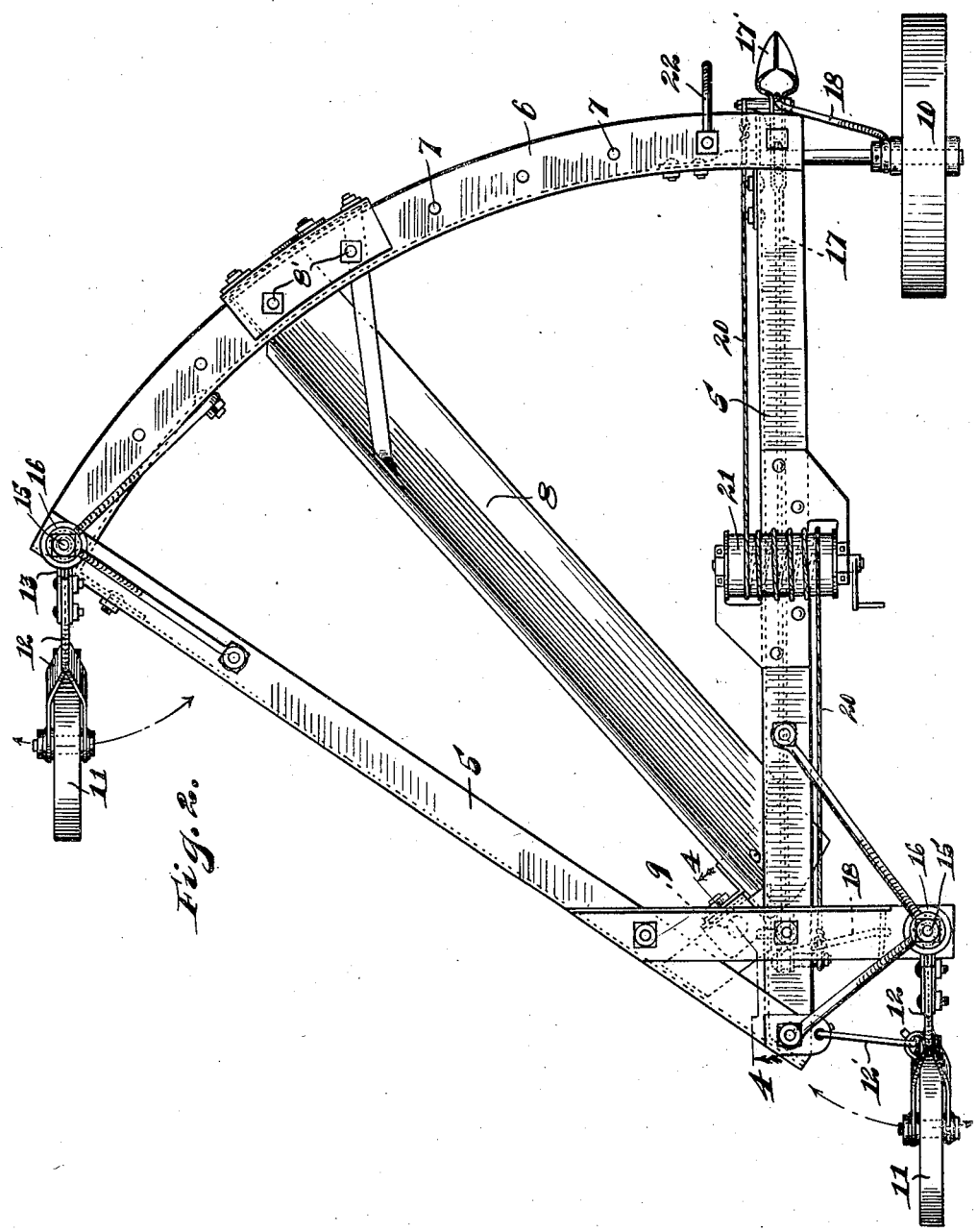

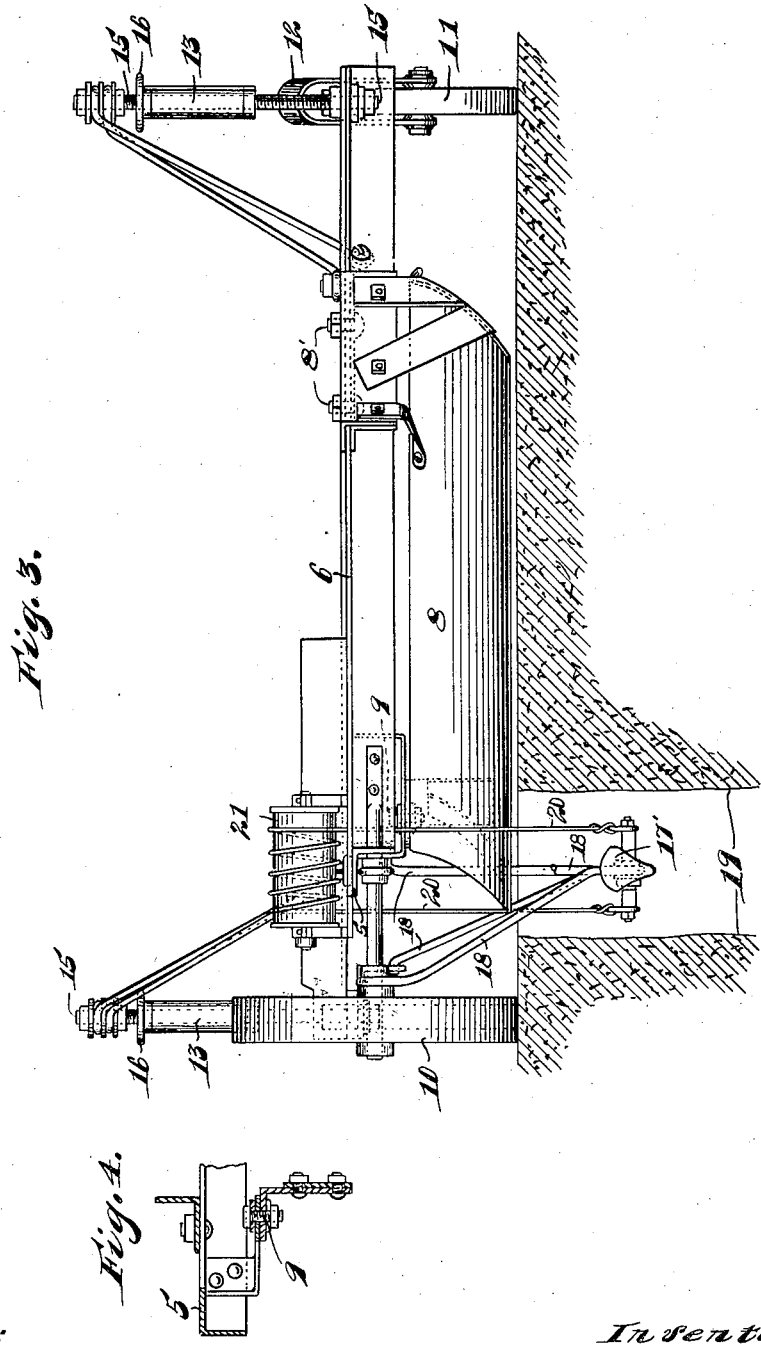

GUSTAV F. STORM, OF SANBORN, IOWA.

DITCH-FILLER.

1,352,155.   Specification of Letters Patent.   Patented Sept. 7, 1920.

Application filed January 11, 1918. Serial No. 211,329.

*To all whom it may concern:*

Be it known that I, GUSTAV F. STORM, a citizen of the United States, and a resident of the city of Sanborn, county of O'Brien, and State of Iowa, have invented a certain new and useful Ditch-Filler, of which the following is a specification.

My invention relates to a certain new and useful ditch filler, and has for its object the provision of an implement which may be employed for the rapid and continuous filling of a ditch, trench or the like, with the earth removed therefrom.

The invention consists in the combinations and arrangements of parts hereinafter described and claimed.

The invention will be best understood by reference to the accompanying drawings forming a part of this specification, and in which, Figure 1 is a side view of a ditch filler embodying the invention and shown in position of use, Fig. 2, a top plan view of the same, Fig. 3, an end view of the same, and Fig. 4, a section taken on line 4—4 of Fig. 2.

The preferred form of construction as illustrated in the drawings comprises a substantially triangular supporting frame 5, having its forward side 6 segmental in form and provided with a plurality of pairs of bolt holes 7 to permit of the angular adjustment of a scraper blade 8 which is pivoted at 9 in said frame, bolts 8' serving to secure the scraper blade in adjusted positions. The frame 5 is provided at one forward side with a permanently mounted tractor wheel 10 and at its other corners with vertically adjustable caster wheels 11, the caster wheels 11 being carried by brackets 12, having bearings 13 swiveled on sleeves 14 threaded on upstanding threaded rods 15 on the frame 5. Sleeves 14 are also equipped with hand wheels 16 for convenience in adjusting the caster wheels, and the rearmost caster wheel bracket is provided with an eye arranged to engage a hook 12' on frame 5. By this arrangement it will be observed that the frame may be readily adjusted vertically and that when desired the rearmost caster wheel may be locked against swinging, such provision being made for locking this wheel against swinging while the implement is in actual use, and so that said caster wheel may be free when it is desired to turn the implement.

An elongated guide member 17, having a pointed nose 17' is suspended from frame 5 by means of links 18 so that said guide may travel in the ditch or trench 19 to be filled. Cables 20 are connected with opposite ends of guide 17 and are wrapped upon the drum of a windlass 21 mounted on the frame of the implement and by means of which the guide member 17 may be vertically adjusted in the trench or may be elevated to clear the trench when it is desired to move the implement. A suitable clevis 22 is arranged on the forward side 6 of the frame 5 for attaching a team or tractor to the implement.

In use the implement is drawn along the ditch or trench, with the guide 17 running therein, and the scraper blade 8 adjusted to throw the earth removed from the ditch thereinto. The guide member 17 prevents displacement of the frame, relatively to the trench and offers suitable resistance to the scraping action of blade 8.

While I have illustrated and described the preferred form of construction for carrying my invention into effect this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A ditch filler comprising a frame; a scraper blade on said frame; and a vertically adjustable guide on said frame arranged to run in a ditch, substantially as described.

2. A ditch filler comprising a frame; an angularly adjustable scraper blade on said frame; and a vertically adjustable guide on said frame arranged to run in a ditch, substantially as described.

3. A ditch filler comprising a wheeled frame; a scraper blade on said frame; and a vertically adjustable guide on said frame arranged to run in a ditch, substantially as described.

4. A ditch filler comprising a wheeled frame; an angularly adjustable scraper blade on said frame; and a vertically adjustable guide on said frame arranged to run in a ditch, substantially as described.

5. A ditch filler comprising a substantially triangular frame, the forward side of said frame being segmental in form and provided with a plurality of bolt holes; a scraper blade pivotally mounted at the rear of said frame and angularly adjustable on said forward side; bolts for securing said scraper blade in positions of angular adjustment; a vertically adjustable guide on said frame arranged to run in a ditch; and supporting wheels for said frame, substantially as described.

6. A ditch filler comprising a substantially triangular frame, the forward side of said frame being segmental in form and provided with a plurality of bolt holes; a scraper blade pivotally mounted at the rear of said frame and angularly adjustable on said forward side; bolts for securing said scraper blade in positions of angular adjustment; a vertically adjustable guide on said frame arranged to run in a ditch; and vertically adjustable caster wheels for said frame, substantially as described.

7. A ditch filler comprising a frame; a scraper blade on said frame; links depending from said frame adapted to hang in a ditch; a guide on said links adapted to run in a ditch; and means for swinging said links to adjust the vertical position of said guide, substantially as described.

8. A ditch filler comprising a frame; a scraper blade on said frame; links depending from said frame adapted to hang in a ditch; a guide on said links adapted to run in a ditch; a winding drum positioned on said frame between said links; and a cable wound upon said drum and having its ends connected with said links, whereby, as one end of said cable winds upon the drum the other end unwinds therefrom, substantially as described.

In testimony whereof I have signed my name to this specification in the presence of two subscribing witnesses.

GUSTAV F. STORM.

Witnesses:
  G. M. SOLON,
  E. A. HOEVEN.